Feb. 3, 1970  J. GOODKIN  3,493,434
ZINC ELECTRODE
Filed Feb. 12, 1968  2 Sheets—Sheet 1
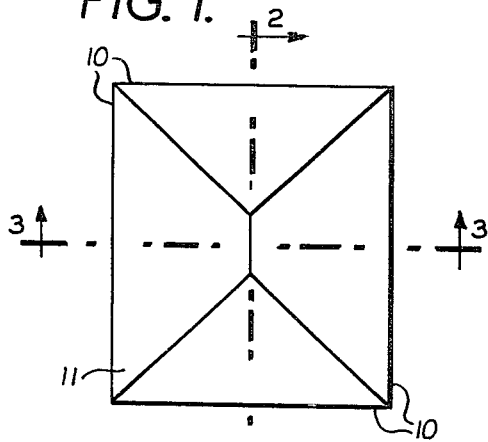
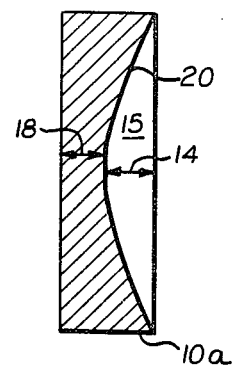
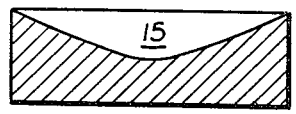
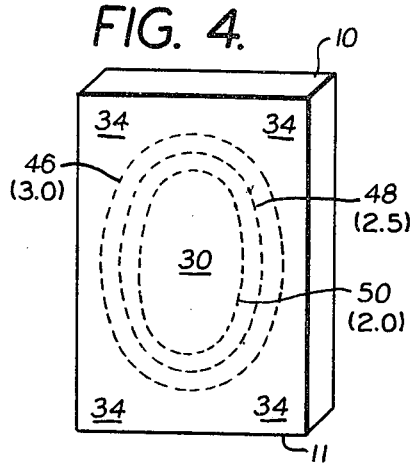
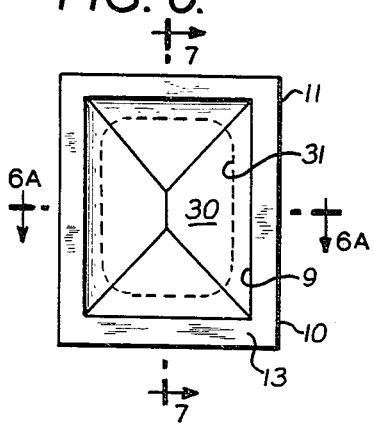
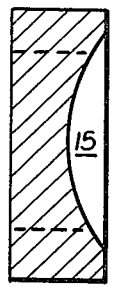
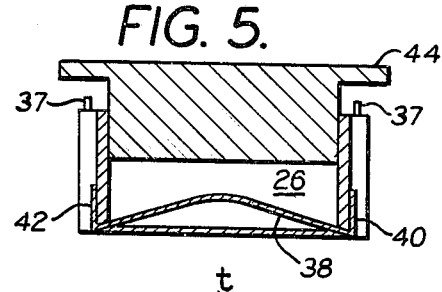
INVENTOR
JEROME GOODKIN
BY
ATTORNEY.

Feb. 3, 1970 J. GOODKIN 3,493,434
ZINC ELECTRODE
Filed Feb. 12, 1968 2 Sheets-Sheet 2
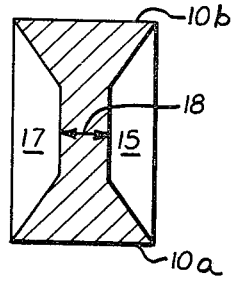
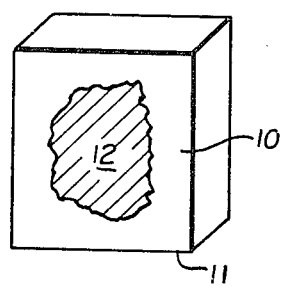
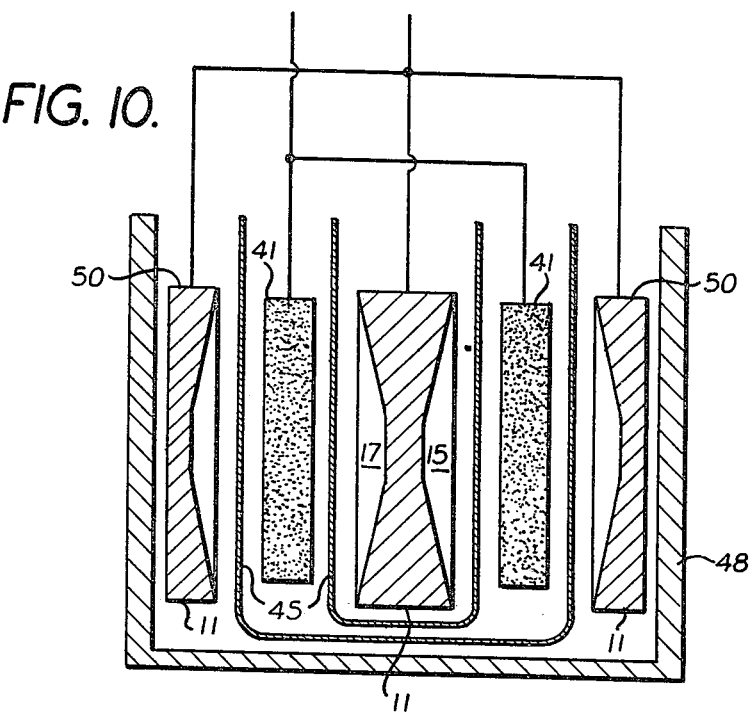
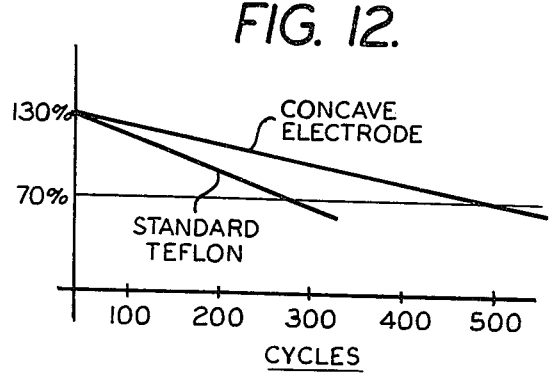
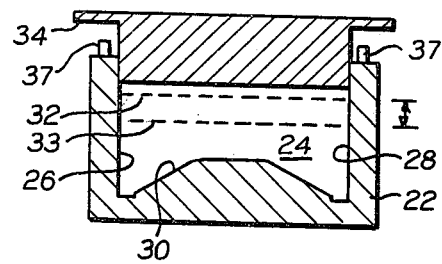
INVENTOR
JEROME GOODKIN
BY
ATTORNEY.

United States Patent Office 3,493,434
Patented Feb. 3, 1970

3,493,434
ZINC ELECTRODE
Jerome Goodkin, Trenton, N.J., assignor to Yardney
International Corp., New York, N.Y., a corporation
of New York
Filed Feb. 12, 1968, Ser. No. 704,738
Int. Cl. H01m 43/02, 41/00
U.S. Cl. 136—30          11 Claims

ABSTRACT OF THE DISCLOSURE

An improved rechargeable electrode is described capable of long cycle life with deep discharge use. The increased life is obtained by initially imparting to the electrode a greater amount of active material such as zinc/zinc oxide per unit area in a region adjacent the peripheral edge of the zinc electrode. More particularly, such increased amount of zinc/zinc oxide adjacent the periphery is in one embodiment obtained by providing the central region of the plate with a depressed region resulting in a decreased thickness of the plate electrode in that region.

In one embodiment the volume density of active material of the electrode varies because the volume upon which the density computation is made includes the depression volume, i.e., the electrode thickness varies directly with the amount of active material per unit area. In a second embodiment, the actual electrode density of active material is varied and provided with a high density region adjacent the periphery of the electrode and a low density region away therefrom towards the center. In a third embodiment both embodiments are combined to yield an exceptionally long life zinc electrode.

BACKGROUND

The problems involved in the design and use of current-producing electrochemical systems are manifold and, apart from structural considerations, derive from the interaction between inactive material and the electrolyte between the closely spaced electrodes. The problems are aggravated when high power densities are required, i.e., available power for unit weight or volume. Among the problems arising in systems of the type described are those concerning redeposition of active materials upon one of the electrode surfaces. For example, rechargeable batteries or cells utilizing zinc/zinc-oxide electrodes have been characterized heretofore by the phenomenon of the growth of zinc dendrites during charge of zinc-containing cells such as the silver-zinc cell.

For rechargeable batteries, the number of cycles to which the system may be exposed can be limited by different shortcomings. Thus, in addition to the above-described dendrite problem, there exists a serious limitation caused by a decrease in the active area of the negative electrode. This problem has been referred to in the literature by various terms, such as "washing," "edge corrosion," "creepage," and "shape change." All of these terms refer to a phenomenon which is visible as a loss of active zinc, principally from the edges and the top of the negative electrode. For instance, where the cell case is transparent, the progress of this change with cycling can be seen as it affects the end electrodes in the cell. Otherwise, the effect is seen when the cell is dissectored for failure analysis. The phenomenon is accompanied by a serious loss in system capacity after relatively few deep cycles.

The mechanism of shape change is not completely understood, although one step is known to be involved. This step is the solution of the zinc as it is anodized during discharge. The oxidized zinc goes into solution in the alkaline electrolyte as a zincate ion. It has been suggested that the increase in electrolyte density results in convection which links the zincate to the lower parts of the cell. On the subsequent charge, the zinc is preferentially deposited at the bottom of the cell, leaving the edges and the top of the electrode relatively bare. It has been determined, however, that the relative position of the cell during charge or discharge has no effect upon this zinc edge depletion phenomena.

Recently, two developments have given substantial increase in the life of a zinc negative. The first of this development is the addition of a preselected quantity of fluorocarbon polymer such as polytetrafluoroethylene intermixed with the zinc electrode. When quantities between 1 and 10% of the pluocarbon by weight are added to the zinc plate, a substantial increase in the life of a rechargeable zinc electrode is encountered. Such an improvement is described in more detail in a copending patent application to F. Solomon, Ser. No. 616,732 filed Feb. 16, 1967, and assigned to the same assignee. The second recent development is the increasing of the size of the negative zinc plates by a small amount so that it is larger and overlaps the positive plate. In the case of a silver-zinc cell constructed with these improvements, the increase in life was considerable and noteworthy. A more detailed description of the increased negative plate size is described in the copending application to James McBreen, Ser. No. 637,722 filed May 11, 1967, and assigned to the same assignee.

However, the problem of zinc edge depletion and subsequent replating towards the center of the plate still occurs although with the above-described improvements, the depletion problem arises only after prolonged cycling of the electrodes. Nevertheless, it being desirable to improve the life of the negative zinc electrode, further modifications are made thereto to further increase the cycle lifetime of the negative zinc electrode.

SUMMARY OF THE INVENTION

It is therefore an object of this invention to provide an electrode that contains more electrochemically active material at the edges and periphery of the electrode than at the center.

It is a further object of this invention to provide a zinc/zinc-oxide electrode which has been geometrically modified and provided with a depression for receiving replated zinc.

It is still further an object of this invention to provide a zinc/zinc-oxide electrode wherein the additional electrochemically active material at the edges is obtained by increasing the concentration of the zinc in a region near the periphery of the electrode and reducing the zinc density towards the center of the electrode and away from the periphery thereof.

It is still further an object of this invention to provide a rechargeable electrochemical system including the improvements of zinc oversizing, teflonization of the zinc plate and increased zinc at the edges or periphery of the electrode with a positive electrode to provide a long-life rechargeable electrochemical generator.

DESCRIPTION

These objects are accomplished with a zinc/zinc-oxide electrode wherein the zinc at the periphery of the electrode is provided with an increased total amount or concentration of active material relative to that available for electrochemical use in the region away from the periphery and nearer the center of the electrode. The particular embodiments enabling this device are as described in relation with the figures wherein:

FIG. 1 illustrates a zinc/zinc-oxide electrode wherein a depression is provided, FIG. 2 and FIG. 3 are cross-sectional views of the electrode of FIG. 1, FIG. 4 illustrates a zinc/zinc-oxide electrode wherein the region near the periphery of the electrode is provided with an increased density of zinc relative to the region away from the periphery, FIGS. 5 and 5A illustrate the device for making the variable density plate of FIG. 4, FIG. 6 illustrates a zinc/zinc-oxide electrode provided with a depression as well as variable zinc density, FIGS. 6A and 7 are cross-sectional views of the electrode of FIG. 6, FIG. 8 illustrates a cross-sectional view of an electrode having both sides provided with a depression, FIG. 9 illustrates a replaced zinc electrode after numerous cycles with zinc depleted from the peripheral edges of the electrode, FIG. 10 illustrates a completed cell assembly incorporating all of the advantages described, FIG. 11 illustrates a device for making the electrode of FIG. 1, FIG. 12 illustrates the improved cycle lifetime obtained with the electrode of this invention.

In FIG. 9, a typical zinc/zinc-oxide electrode is illustrated after prolonged cycling. Note, for instance, that the zinc has been entirely eliminated from the peripheral edge 10 and replated in a region 12 substantially concentric with the electrode 11. The amount of depletion around the periphery 10 varies with cycle life and use but may be said to be generally of the order of 50% of the total arc before the electrode becomes practically useless.

To accommodate the replated zinc of region 12 in FIG. 9, the electrode of FIG. 1 is provided beforehand with a depression 15. In FIG. 1 a front view of the electrode is illustrated which shows by the side cross-sectional view of FIGS. 2 and 3 a maximum depth 14 generally in the center of the electrode 11 and gradually tapering upward with decreasing depth towards the periphery 10. The depression or concavity 15 has a depth and volume computed to receive excess zinc near the periphery 10 or edge of the electrode 11. In the electrode of FIG. 1 the minimum electrode 11 thickness 18 is approximately one-half the thickness of the electrode at the edge 10. In some instances, it is desirable that the maximum depth 14 of the depression 15 formed by the bottom wall 20 is located closer to the bottom edge 10a of the electrode 11. The bottom wall 20 of the depression 15 may gradually taper towards the peripheral edge 10 with corresponding decreasing depth of the depression 15 or it may be terminating somewhere short of the periphery as described in relation to FIG. 6.

The forming of the electrode 11 generally is accomplished by placing the negative oxide mix in a mold 22 shown in FIG. 11.

The mold 22 has a powder receiving chamber 24 bounded by side walls 26 and 28 and a contoured bottom wall 30 provided with shape commensurate with the desired depression 15 and piston 34. The zinc oxide mix is filled to a level 32 and thereafter compressed to level 33 controlled by the stops 37 by piston 34. Since the oxide mix is uniformly compressed the same distance an even density plate is obtained but having a depression 15.

Generally, the depression 15 is provided with a maximum depth 14 so that the minimum thickness of the electrode 11 is approximately one-half the maximum thickness at the edges 10. If, in addition to this shape modification as described, the zinc/zinc-oxide electrode is provided with a fluorocarbon polymer such as polytetrafluoroethylene, of from 1 to 10% by weight of the electrode, then a superior rechargeable zinc electrode has been obtained.

The manufacture of a zinc plate of the type shown in FIG. 1 in combination with a Teflon binding material may be as described in the copending application to Solomon, Ser. No. 616,732, filed Feb. 16, 1967. For instance, a homogeneous mixture comprising between .5 and 5% of mercuric oxide, HgO to zinc oxide is further admixed with a water emulsion containing approximately 60% solids of polytetrafluoroethylene so that, after heating, the mixture contains between 1 and 10% by weight of polytetrafluoroethylene and preferably between 1½ and 5%. The mixture is then cured by heating to between 200 and 350° centigrade. The plate is then pressed into the mold as heretofore described with a grid for conduction.

FIG. 8 illustrates an electrode of the type shown in FIG. 1 but with both faces of the plate provided with a depression 15 and 17. The electrode of FIG. 8 is shown in a section corresponding to that of FIG. 2. The deepest parts of the depressions 15 and 17 are in this case located closer to the bottom edge 10a of the electrode than the top edge 10b. The depth of the two depressions 15 and 16 are about the same and each approximately one-third the total thickness at the edges of the electrode 11 and the thickness 18 of the electrode 11 adjacent the depressions 15 and 17 is approximately one-third of the maximum thickness near the periphery edge 10.

The electrode of FIG. 8 can also be the cross-sectional view of a basically cylindrical zinc oxide electrode having a single active face with a depression 15. In such case two peripheral edges 10a and 10b are provided.

In FIG. 4 a zinc electrode is shown wherein the thickness is relatively constant. A central region, generally indicated at 30 and having a circumference generally following the periphery 10 is provided with a zinc volume density which is less than a region near the periphery 10 and generally indicated at 34. The variation in density and the corresponding difference in porosity between the central region 30 and the peripheral region 34 is such that during the numerous cycles of the zinc rechargeable electrode replated zinc will tend to fill the larger pores of the region 30. Since the region 34 is denser it can tolerate a reduction in the amount of zinc therein without a serious zinc depletion and similarly the greater porosity of the central region 30 can accept the excess zinc without shape deterioration.

The varied density of the zinc electrode 11 of FIG. 4 is obtained by the mold device of FIG. 5. The mold has a chamber 26 bounded by a collapsible bottom wall 38, side walls 40 and 42 and a piston 44. The shape of bottom wall 38 affects the density of the plate in such manner that upon compression of the zinc powder in chamber 26 by piston 44, the excess powder in the regions near side walls 40 and 42 is compressed into a flat electrode plate. The shape of the uncollapsed bottom wall 38 then determines the density variation or porosity variation of the plate. The bottom wall 38 is collapsible so that a flat electrode may be made. On the other hand, where both a variable density and a depression 15 are desired as in FIG. 6 then a fixed bottom mold section 30 as in FIG. 11 may be added. The slope of bottom wall 38 is varied in three dimensions to provide closed equi-density lines 46, 48, and 50. Stops 37 are provided to limit the compression by the piston 44.

An alternate approach of making a variable density plate of FIG. 4 is by linearly compressing a plate of the type shown in FIG. 1 into a flat plate.

The density variation is shown in FIG. 4 by the equal density lines 46, 48, and 50 corresponding respectively to 3.0 gr./cm.$^3$, 2.5 gr./cm.$^3$, and 2.0 gr./cm.$^3$ of mix taken as zinc. In the outer region 34 bounded by the periphery 10 the density is approximately between 3.5 gr./cm.$^3$ and 3.0 gr./cm.$^3$ as zinc. At the central region 30 the density is somewhere between 1.5 gr./cm.$^3$ and 2.0 gr./cm.$^3$ decreasing from the edge to the center. The size of the region 30 is approximately equivalent to the replated region 12 of FIG. 9 for an electrode 11 of similar dimensions. The region 34 corresponds in width and area approximately to the peripheral region 10 of the electrode of FIG. 9, where an electrode 11 of similar dimensions is used.

FIG. 6 illustrates an electrode containing both the advantages presented in FIG. 1 and FIG. 4. Thus, an electrode 11 is provided with a depression 15 as well as a central region of lower density 30 bounded by equidensity line 31. The depth of the depression 15 in FIGS. 7 and 8 is comparable to that in FIG. 1, approximately one half the maximum thickness at the peripheral edge 10. Furthermore, the depression 15 does not entirely taper off towards the peripheral edge 10, but terminates at a second periphery 9 within the external edge periphery 10. As a result, there is a small edge 13 all around the electrode 11 of FIG. 6. The edge 13 serves to support electrode separators and avoids sharp cuttings edges of FIG. 1.

FIG. 10 illustrates a completed assembly of the electrodes of the previous figures. In particular, two positive silver electrodes 41 are juxtaposed a zinc electrode 11 of the type shown in FIG. 8 and wherein thus a depression on both faces is provided. The depressions 15 and 17 were filled with a nylon fluff material, which is prepared by beating nylon cloth fragments in a blender. The silver electrodes 41 are wrapped in a semipermeable membrane 45 so that the entire package can be contained in a cage 48 which is not affected by the electrolyte contained between the electrodes. End electrodes 50 are each provided with a single faced depression 15 adjacent the positive electrodes 41. The positive electrodes are smaller than the zinc electrode 11 to obtain an edge overlap by the latter and increase its lifetime. In addition, the zinc electrode is teflonated to the extent as heretofore described.

As an example of a cell operated with electrode of FIG. 1, two silver-zinc cells of nominal 5 ampere hour capacity were constructed as follows. A mix containing 94% commercial zinc oxide, 5% Teflon and 1% mercuric oxide were compresed to form 5 negative electrodes. In addition, 4 silver electrodes were provided each containing 5 grams of active silver powder. A standard separator system was provided and the space formed by the depressions was filled with a nylon fluff material as described in relation to the FIG. 10 and comprising nylon cloth fragments. These cells were cycled on a 60% depth of discharge regime and were charged at 1.5 amperes. After more than 150 cycles no change in the shape has been observed with this type of electrode. In addition, extended edges were employed, as well as teflonation of the electrode. The longitudinal dimension of the zinc electrode, i.e. from the top edge 10 to the bottom edge 22 was 1 27/32 inch, the width of both the top and bottom edges was 1 23/32 inch, the center of the maximum depression was located approximately 9/16 inch from the bottom edge and 55/64 inch from the side. The thickness of the plate was .07 inch and the maximum depth of the depression was .03 inch. FIG. 12 illustrates the extended lifetime obtained with these electrodes as compared to a standard teflonated zinc electrode without density variation.

Having thus described my invention, in particular embodiments incorporating zinc oxide plates, other electrodes exhibiting like plating characteristics as zinc could use this invention. Thus an active electrode material exhibiting similar electrolyte soluble behavior would come within the scope of the following claims.

I claim:

1. An electrode for rechargeable electrochemical cells consisting of a substantially planar body of finite thickness having opposing surfaces and bounded by at least one peripheral edge and comprising electrolyte-soluble electrochemically active material, with the electrochemically active material distributed through the thickness and provided with a concentrative gradient from the edge to the center of active material per unit of surface area ranging from higher concentrations of active material per unit surface at the peripheral portions adjacent to the edge and lower concentrations of active material per unit surface at the portions of the planar body at the center.

2. The electrode according to claim 1 wherein the active material is selected from the group of zinc and zinc oxide.

3. The electrode according to claim 2 wherein the concentrate gradient of active material per unit area is obtained by varying the thickness of the electrode.

4. The electrode according to claim 3 wherein at least one substantially planar surface is provided with a central depression tapering toward the edges.

5. The electrode according to claim 4 wherein the central depression is filled with inactive fibrous filler.

6. The electrode according to claim 3 wherein the initial thickness of the electrode at the peripheral portions is up to twice the thickness at the central portions.

7. The electrode according to claim 2 wherein the concentration gradient of active material per unit area is obtained by varying the density in the area of the active material.

8. The electrode according to claim 7 wherein the varying density results from varying degrees of compression of the zinc.

9. The electrode according to claim 8 wherein the density of the active material ranges from 4.0 to 1.5 grams per cubic centimeter.

10. The electrode according to claim 2 wherein the concentration gradient of the active material is achieved by a combination of varying the density and the thickness of the active material.

11. The electrode according to claim 2 wherein a conductive grid is embedded in the body of said electrode.

References Cited

UNITED STATES PATENTS

| | | | |
|---|---|---|---|
| 1,287,676 | 12/1918 | Grothe | 136—125.2 |
| 2,189,463 | 2/1940 | Eddy | 136—125.2 |
| 3,003,015 | 10/1961 | Duddy | 136—30 |
| 3,049,578 | 8/1962 | Jonsson et al. | 136—30 |
| 3,060,254 | 10/1962 | Urry | 136—30 |
| 3,082,278 | 3/1963 | Doyen | 136—30 |
| 3,293,078 | 12/1966 | Frye | 136—120 |
| 3,345,213 | 10/1967 | Lambert et al. | 136—75 |
| 3,346,421 | 10/1967 | Thompson et al. | |
| 3,348,975 | 10/1967 | Ziering. | |
| 3,403,057 | 9/1968 | Stankavich et al. | 136—120 |

WINSTON A. DOUGLAS, Primary Examiner

C. F. LEFEVOUR, Assistant Examiner

U.S. Cl. X.R.

136—125